(12) United States Patent
Shahrokhi

(10) Patent No.: US 8,154,859 B2
(45) Date of Patent: Apr. 10, 2012

(54) CABLE MANAGEMENT SYSTEM FOR A MOVABLE DISPLAY DEVICE

(76) Inventor: Farshad Shahrokhi, New York, NY (US)

( * ) Notice: Subject to any disclaimer, the term of this patent is extended or adjusted under 35 U.S.C. 154(b) by 0 days.

(21) Appl. No.: 12/564,246

(22) Filed: Sep. 22, 2009

(65) Prior Publication Data

US 2010/0008029 A1  Jan. 14, 2010

Related U.S. Application Data

(63) Continuation of application No. 11/433,411, filed on May 15, 2006, now Pat. No. 7,593,217.

(60) Provisional application No. 60/680,523, filed on May 13, 2005.

(51) Int. Cl.
*H05K 5/00* (2006.01)
*H05K 7/00* (2006.01)
*B66B 9/00* (2006.01)
*E04H 6/06* (2006.01)
*G09F 7/18* (2006.01)
*A47H 1/10* (2006.01)
*A47B 81/00* (2006.01)
*A47B 97/00* (2006.01)

(52) U.S. Cl. .................. 361/679.01; 361/679.21; 52/29; 52/39; 312/223.6; 248/317; 248/917

(58) Field of Classification Search ............. 361/679.01, 361/679.21; 312/223.2, 223.3, 223.6; 248/317, 248/328, 343, 917; 52/29, 39
See application file for complete search history.

(56) References Cited

U.S. PATENT DOCUMENTS

| | | | |
|---|---|---|---|
| 5,683,064 A | 11/1997 | Copeland et al. | |
| 6,142,590 A * | 11/2000 | Harwell | 312/223.1 |
| 6,449,909 B1 * | 9/2002 | Baloga et al. | 52/36.1 |
| 6,739,096 B2 * | 5/2004 | Feldpausch et al. | 52/36.1 |
| 7,032,523 B2 | 4/2006 | Forslund, III et al. | |
| 7,377,475 B1 * | 5/2008 | Lopez | 248/323 |
| 2002/0194792 A1 * | 12/2002 | Feldpausch et al. | 52/36.1 |

OTHER PUBLICATIONS

ISR and WO for PCT/US06/18753 Jun. 26, 2008, Sharokhi, entire document.

* cited by examiner

*Primary Examiner* — Anthony Haughton
(74) *Attorney, Agent, or Firm* — Sheldon Parker, Esq

(57) ABSTRACT

A support system for a display device comprise a track system that defines a display movement path for movement of the display device. A support member that is movably engaged with the track supports the movement of the display device along the movement path. A cable management system has a cable of predetermined length that electrically connects to the display device and a flexible cable carrier disposed in the track system carries the cable. The flexible cable carrier has a fixed end along a first cable movement path and a moving end along a second cable movement path that is distinct from the first cable movement path.

19 Claims, 7 Drawing Sheets

CABLE MANAGEMENT SYSTEM FOR A MOVABLE DISPLAY DEVICE

BACKGROUND OF THE INVENTION

Advances in technology have created an increasing need for presenting useful data and content via display devices used in computers and televisions as well as medical or monitoring units. Moreover, convergence of data and content is leading the way for more versatile display devices where for example, computer information and high definition content can be viewed on a single display device. The most important object of the living room has undergone a substantial transformation in the last few decades. The flattening of the TV screen and the possibility to integrate it with the computer has started to shape the way in which most spaces are organized.

Space considerations has always been paramount in the design and use of display devices. In today's world where space has become a commodity, efficient use of limited areas for display devices remains a challenge for both economic and practical reasons. For example, for a city apartment-dweller, it is beneficial to be able to store his or her display device out of the way when the device is not in use and to be able to position it at a convenient location when viewing is necessary. In addition, it is often desired to move the display device from one area to another area, for example, from a study area to an entertainment area. In a studio-style apartment, it is useful to have a display device that can be rotated in one direction for viewing from the bed, to another position for viewing from the dining area, for example. In a business environment, the ability to efficiently store the display device in an office environment also allows space to be used for multiple purposes, e.g., a conference room or office area. The same considerations apply in a medical/dental facilities where efficient space utilization is of paramount concern for positioning and storage of display devices for various types of medical devices. In sum, the ability to move a display device throughout a given area and to use the display device for multiple purposes allows for more efficient use of limited space, imparting flexibility and convenience to an otherwise confined space.

Moveable display device systems are currently used in businesses, homes, medical offices, hospitals, fine dining establishments, entertainment venues, and so on. Such display devices include a mechanism that supports the movement of the display device along a display movement path. It is also known to move display devices horizontally along an overhead track, to adjust the height of the display device, and to position the display device by rotating it to a desired angle. One such display system is disclosed in U.S. Pat. No. 6,739,096, where a movable support system for a display device has a track system and a movable base. In the disclosed system, the display device may be selectively positioned for use in a variety of locations relative to the track system.

In order to function properly, display devices must be provided with suitable electrical interconnections for power and display signals via corresponding cables. However, currently available moveable display systems, such as the one disclosed in U.S. Pat. No. 6,739,096, do not offer a robust system for managing the electrical cabling of movable display devices. For example, a movable display device should operate reliably while preventing electrical cables from being exposed. Otherwise, electrical cables may become tangled through repeated movement. Tangled wires can interfere with the movement of the display device, impede signal transmission, or lead to the disconnection of an electrical signal. Exposed wires suffer from increased wear-and-tear and can also be a safety hazard.

Therefore, there exists a need for a robust cable management system for a movable display device.

SUMMARY OF THE INVENTION

Briefly, according to the present invention, a display support system, e.g., a ceiling-mount system, for a display device that addresses its mobility, functionality and elegance. The display support system comprises a track system that defines a display movement path for movement of the display device. A support member that is movably engaged with the track system supports the movement of the display device along the movement path, which can be substantially straight or curved. A cable management system has a cable of predetermined length that electrically connects to the display device and a flexible cable carrier disposed in the track system carries the cable. The flexible cable carrier has a fixed end along a first cable movement path and a moving end along a second cable movement path that is distinct from the first cable movement path. In one embodiment, the first cable movement path and second cable movement path are substantially parallel to each other and the display movement path.

According to some of the more detailed features of the present invention, the support member is rotatable around an axis substantially perpendicular to the display movement path, including a stop for preventing rotation of the display beyond a rotation angle limit of for example 360 degrees (one full turn). More specifically, the support member has a suspension tube inserted into a rotating support bracket that supports the display device. According to another more detailed feature of the present invention, the support system further includes one or more lights disposed along the track system. The track system comprises at least one rail and at least one wheel movably engaged with the rail for moving the display along the display movement path.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention.

Figure 1:
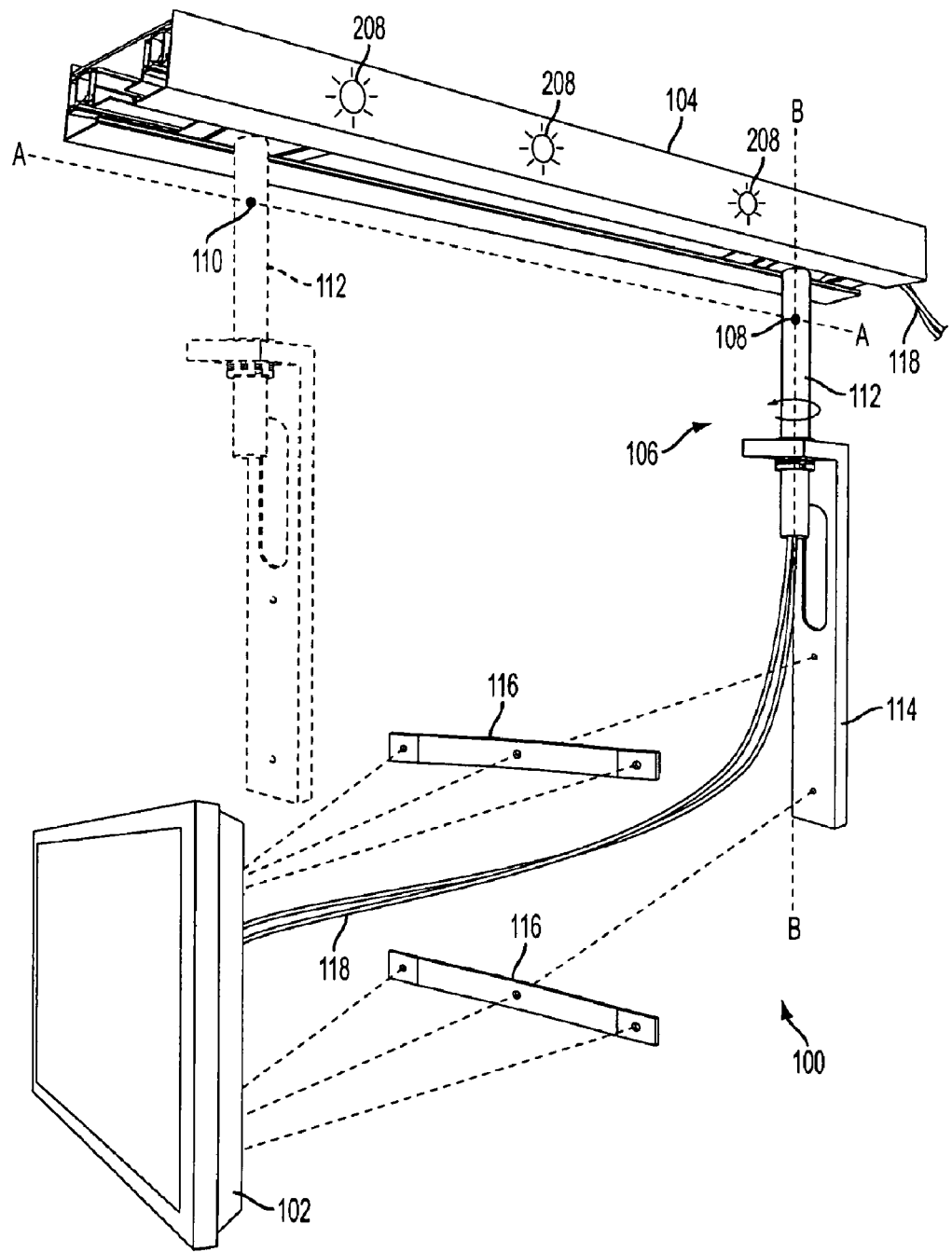
FIG. 1 is a perspective view of a display support system according to the present invention.

FIG. 1 shows a perspective view of a display support system 100 for a movable display device 102 according to an exemplary embodiment of the present invention. The display support system 100 includes a track system 104, a cable management system disposed in the track system (shown in FIGS. 2, 4A and 4B), and a support member 106, which is moveably engaged with the track system 104 for supporting the movement of the display device 102 along a display movement path A-A. As shown, the display movement path A-A is defined by the opposing ends the track system along its length. One end of the track system 104 along the display movement path A-A corresponds to the starting movement point 108, where the movement of the display device begins. The other end of the track system 104 corresponds to the final movement point 110 of the display device 102, where the movement of the display device ends. Depending on the space requirements, the length of the track system can be selected to accommodate a wide variety of display movement paths. Although, the display movement path A-A of FIG. 1 is shown to be substantially straight, the present invention can supports curved or angular display movement paths as well as any combinations of the foregoing. Consequently, the display movement path can comprise curves or angles, forming full or partial elliptical, circular, triangular, rectangular paths, amongst others.

As shown in FIG. 1, the support member 106 includes a suspension tube 112 that extends downwardly along an axis B-B, which is substantially perpendicular to the display movement path A-A. The suspension tube 112 is coupled to a support bracket 114 that engages with parallel adapter ribs 116 for suspending the display device 102 for movement under the track system 104. In one embodiment, the suspension tube 112, support bracket 114 and adapter ribs 116 are laser cut to proper dimensions to allow for mounting of a wide variety of display device of different sizes and weights.

Figure 2:
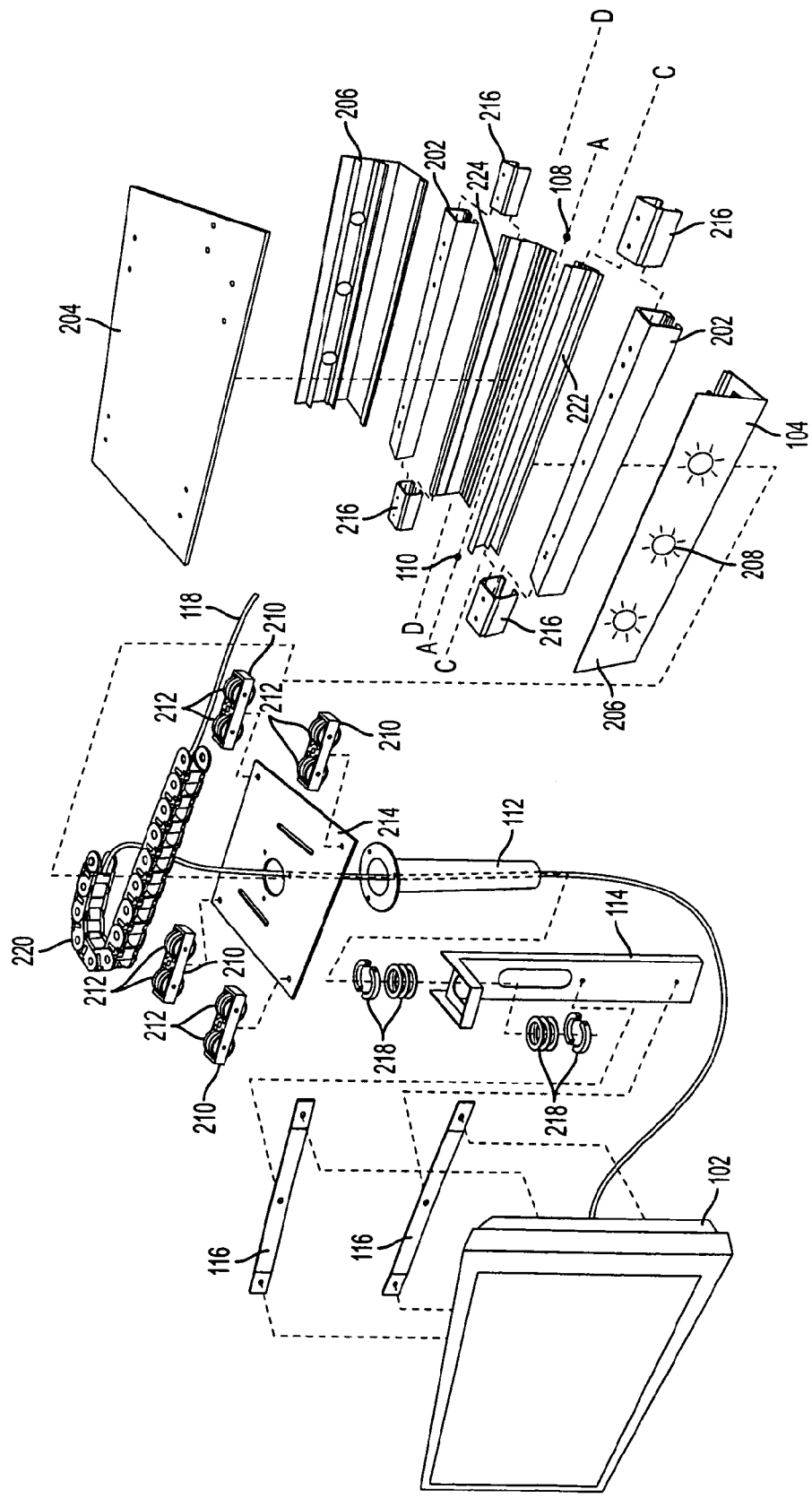
FIG. 2 is an exploded side view of the display support system of FIG. 1.
Figure 5:
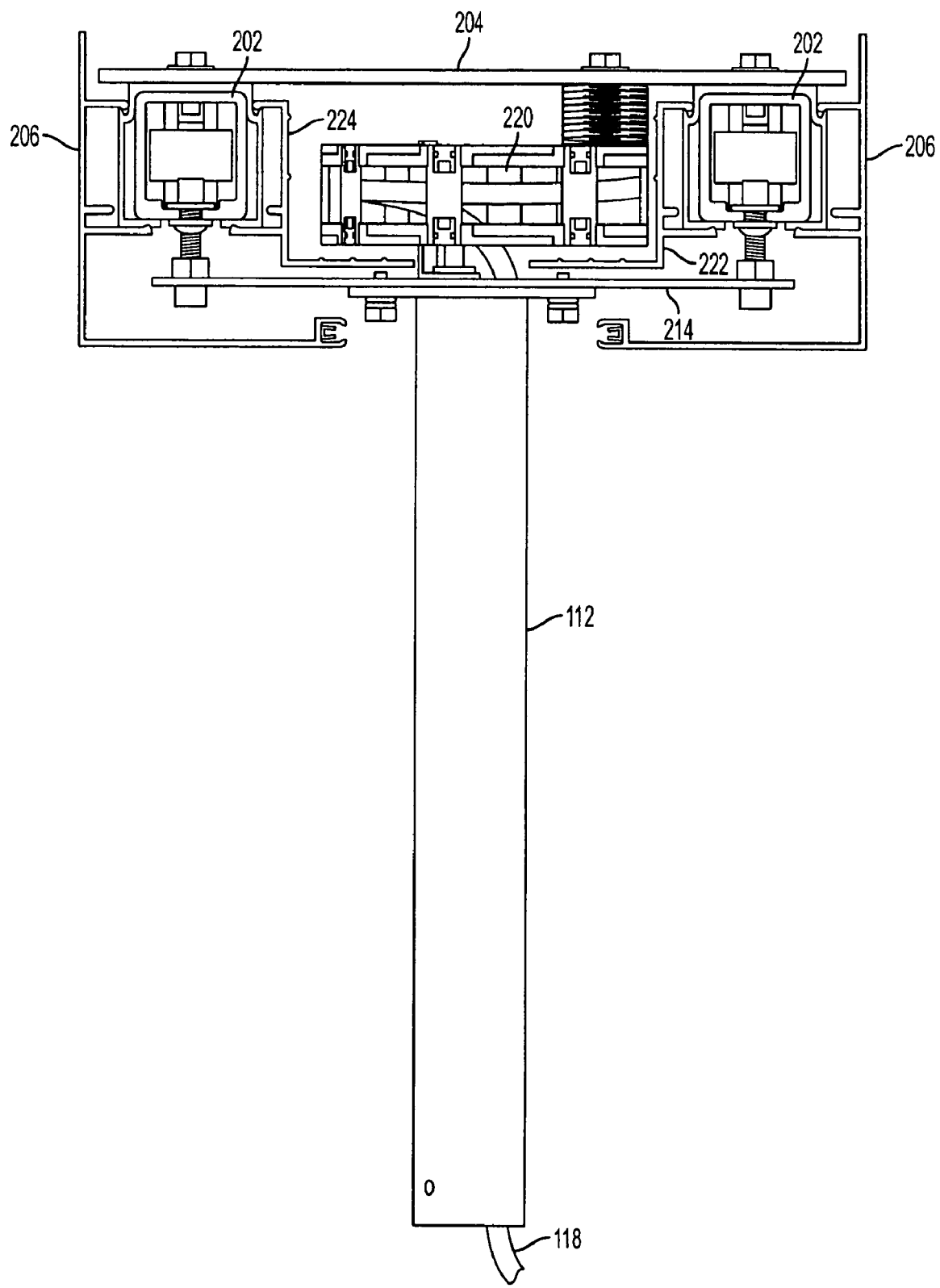
FIG. 5 is a cross sectional view of the support system of FIG. 1.

FIG. 2 shows an exemplary exploded view of the support system 100 of FIG. 1. In the exemplary embodiment of the FIG. 2, the track system 104 comprises a double-track system having two parallel rails 202 forming track movement channels that run along the display movement path A-A from the starting movement point 108 to the final movement point 110. The rails 202 are coupled to each other via a fixed support plate 204. The fixed support plate 204, which can be affixed to a ceiling or other support point (not shown), engages with opposing soffits 206 that cover the track system 104 to provide desired aesthetic features. In an exemplary embodiment, the soffits 206 cover the track system 104 by a snap-fit mechanism which snaps the soffits 206 to the rails 202 via snap attachment modes known in the art as shown in FIG. 5. The track system 104 can be fitted with various soffit shapes, including winged soffit, pyramid soffit, standard (square) soffit, curved soffit, etc. The exterior of the opposing soffits 206 can be equipped with one or more lights 208 disposed along the display movement path A-A. The lights 208 can be used either to enhance the viewing of the display device 102 or independently provide ambient overhead lighting in any space such as the home or office.

As described later in detail, the cable management system of the present invention (shown in FIGS. 2, 4A and 4B) manages electrical interconnections to the display device 102, including power and video/audio signals as applicable. Such electrical interconnection are provided by running suitable cables 118 through a hollow interior portion of the suspension tube 112, which is dimensioned properly, e.g., 2" diameter, to accommodate all the necessary cables. Such cables are made to specified lengths and include suitable connector configurations to accommodate electrical interconnections with the display device 102. Preferably, the support bracket 114 is rotatable around the axis B-B to allow for the rotation of the display device 102 to a suitable rotated position, as further described below.

Each rail 202 is dimensioned to accommodate a pair of trolleys 210. Each trolley 210 is made up of double roller plastic or steel wheels 212 that travel along the length of the track system 104 from the starting movement point 108 to the final movement point 110. The four trolleys 210, which are paired in the two parallel rails 202, are spaced via a non-fixed support plate 214 through proper attachment means, e.g., screws, etc., thereby allowing for the movement of the non-fixed support plate 214 along the track system 104 from the starting movement point 108 to the final movement point 110. A pair of stops 216 positioned at each end of the rails 202 substantially proximate to the starting movement point 108 and the final movement point 110 define the movement limits of the trolleys 210 along the track system 104. The suspension tube 112 is attached to the non-fixed support plate 214 via proper means for moving the support member 106 and consequently the display device 102 on the rails 202 along the display movement path A-A. It should be noted that the track system 104 can be a single-track, double-track, or multiple-track system having at least one rail along the display movement path and at least one wheel moveably engaged with the rail, wherein the wheel is coupled to the support member 106 for moving the display device 102 along the display movement path A-A.

As stated above, the cable management for the display track system of the present invention uses one or more cables 118 of predetermined length that electrically connects to the display device 102. A flexible cable carrier 220 disposed in the track system 104 carries the cables 118 along a first cable movement path C-C defined by a first cable carrier support plate 222 and a second cable movement path D-D defined by a second cable carrier support plate 224, as further described in detail below. The flexible cable carrier 220 used in the exemplary embodiment of the invention comprises a chain made up of pivoted linked mounting brackets with each bracket having split cross bars along its inner radius for convenient insertion of the cables 118 therein. One such flexible cable carrier 220 comprises Series E26/Z26 "E-Z Chain" manufactured by Igus Inc.

Figure 3A:
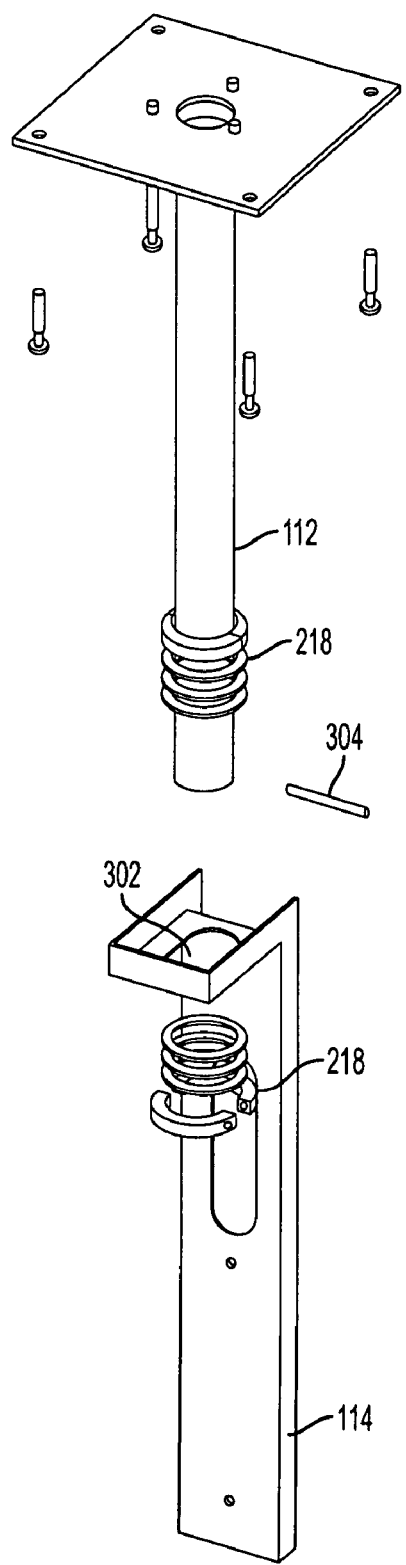
FIG. 3A and FIG. 3B are exploded views of the support member of the system of FIG. 1.
Figure 3B:
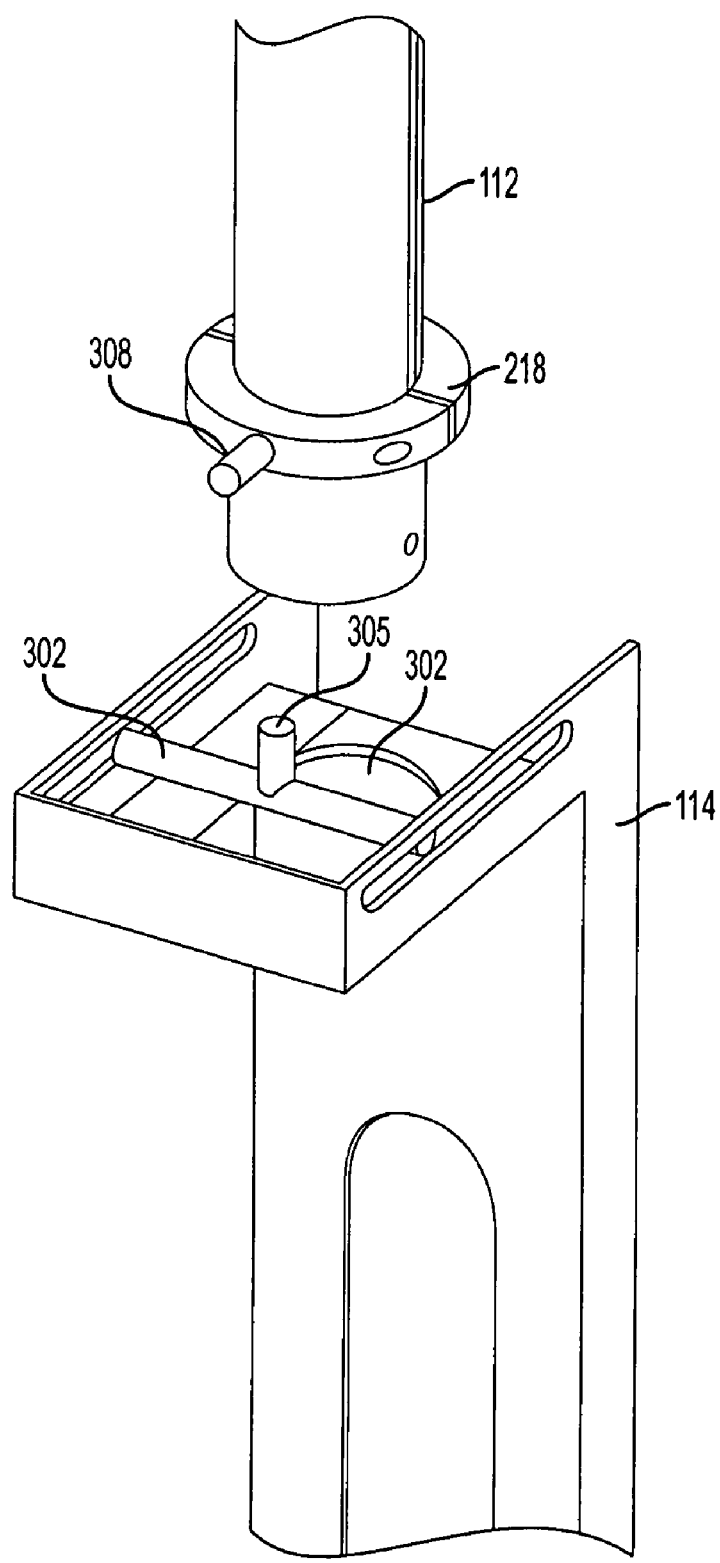

The support bracket 114 is rotatably attached to the suspension tube 112 for supporting the adapter ribs 116 affixed to the display device 102. The rotation of the support bracket 114 around the suspension tube 112 is provided via rotation members 218 which are fixedly attached to the suspension tube 112. More specifically, in an exemplary embodiment, the rotation members 218 comprise one or more properly dimensioned washers, shaft covers and thrust bearings on the suspension tube 112 where the support bracket 114 rotates within the rotation member around the suspension tube 112. FIG. 3A shows an exploded view of the rotation member 218. As shown, the support bracket 114 has a circular aperture or opening 302 for insertion of the suspension tube 112 therein. The rotation members 218 are affixed along the length of the suspension tube 112 and engage with the support bracket 114 via a pin 304 that crosses the diameter of the suspension tube 112 under the support bracket 114 for holding it rotatably suspended. In this way, the support bracket 114 can rotate around the suspension tube 112 for rotational positioning of the display device 102. As shown in FIG. 3B, the support member 106 further includes a stop to prevent the display from rotating beyond a rotation angle limit of for example 360°. This rotational limits prevents electrical wires from tangling, eliminating the potential for any electrical connectivity issues. As shown, the support bracket 114 is equipped with a cross bar 302 having an upwardly protruding piece 306 along its length. The rotation member 218 includes a horizontally protruding piece 308 that engages the upwardly protruding 306 to prevent the rotation of the support member 114 beyond a full turn of 360 degrees.

Figure 4A:
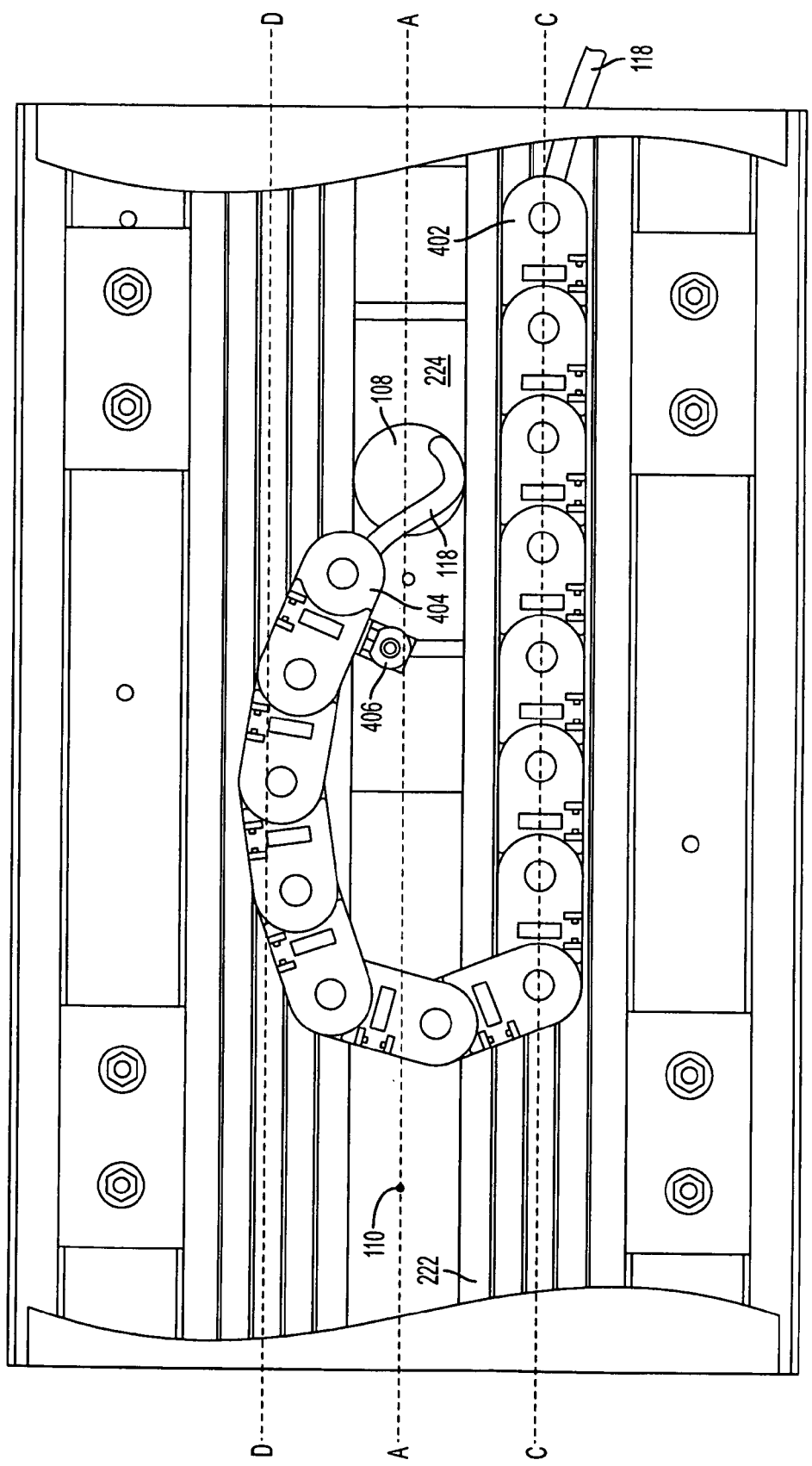
FIGS. 4A and 4B are top views of the cable management system according to the present invention.
Figure 4B:
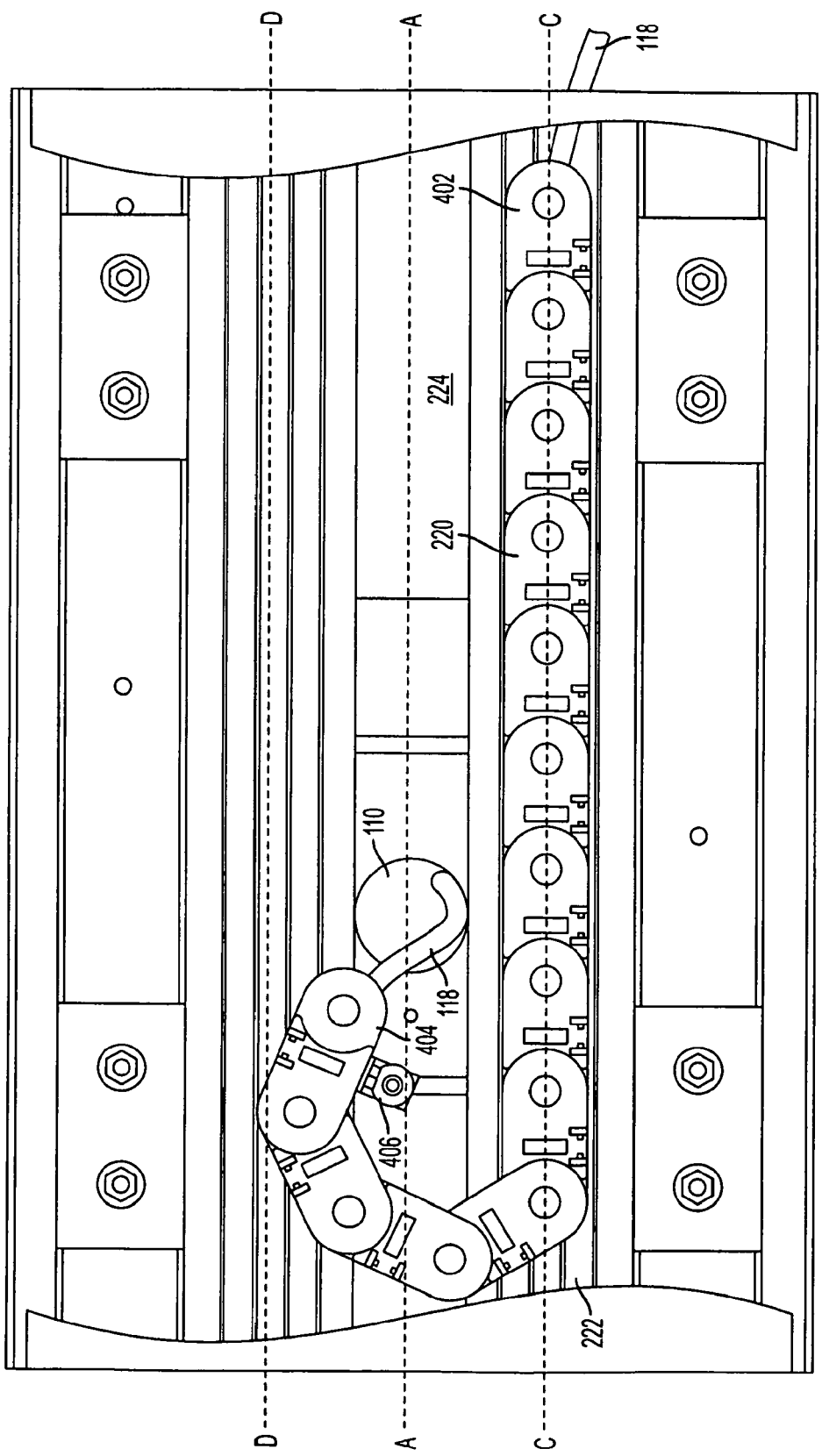

FIG. 4A shows the top view of the cable management system of the present invention at the starting movement point 108 and FIG. 4B shows the top view of the cable management system at the final movement point 110. The cable management system of the present invention comprises power and video/audio cables 118 that connect electrically to the display device 102 for providing power, video and optionally audio signals as necessary. The cables 118 are disposed within the flexible cable carrier 220 and are dimensioned to be fixed at one end at the power, video and audio output source (not shown) and at the other end at the inputs of the corresponding signals into the display device 102. The flexible cable carrier 220 carries the cables 118 along two separate cable movement paths C-C and D-D, which are distinct from each other. In one embodiment, the first and second cable movement paths C-C and D-D are parallel to each other and the display movement path A-A.

Supported by the cable carrier plate 222, the flexible cable carrier 220 has a fixed end 402 positioned on the first cable movement path C-C and extends along this path until it crosses over to the second cable movement path D-D where it is terminated at a moving end 404 of the flexible cable carrier 220. The moving end 404 is supported by the cable carrier plate 224 as it moves back and forth with the traversal movement of the display devices 102 along the display movement path A-A from the start movement point 108 to the final movement point 110 and vice versa. The movement of the moving end 404 of the flexible carrier 220 along the second movement path D-D is primarily led by the fixed ends of the cables 118 at the display device 102 as well as a support pin 406 that is movably attached along the track system 104.

As shown in FIG. 4A, at the starting movement point 108, the full length of the flexible carrier 220 is divided to extend along the fist and second cable movement paths C-C and D-D. At the final movement point 110, shown in FIG. 4B, most of the length of the flexible cable carrier 220 is on the first cable movement path C-C and only a short portion extends to the second cable movement path D-D terminating at the fee end 404 of the flexible cable carrier 220. As the display device 102 is moved along the display movement path A-A from the final movement point 110 towards the starting movement point 108, the moving end 404 of the flexible cable carrier 220 also moves along the second cable movement path D-D towards the final movement point 110. As a result, the present invention fills a need in the art for a robust cable management system compatible with a support system for movable displays. Due to the durability of the invention, the need for maintenance and repair of the movable support system is significantly reduced, and the lifetime of the system in increased. FIG. 5 shows a cross-sectional view of the present invention.

Thus the present invention responds to the need to provide customized intelligence in both residential and commercial spaces, as increasingly, users want spaces to be flexible and adaptable to their requirements. With the present invention, the flat screen can now be used in multiple areas, breaking the precept that bulky display devices must be made the centerpiece of the living room. Wires are no longer a hindrance to mobility as they are with traditional a/v equipment carts, since all cables are integrated into a cable management system inside the track. The flexibility of flat screen use is increased, but the technology is hidden away within the track's sleek exterior.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention claimed is:

1. A display system for moving the display along a display movement path, comprising:
    a display device, said display device being moveable through in a horizontal plane,
    a flexible cable carrier, said the flexible cable carrier having a fixed end along a first cable carrier movement path and a moving end along a second cable carrier movement path distinct from said first cable movement path,
    a communication cable means, said communication cable means being connected at a first end to said display device and at a second end to an output source and being carried within said flexible cable carrier, and
    means for supporting said flexible cable carrier along said first cable carrier movement path and along said second cable carrier movement path, said first cable carrier movement path and said second cable carrier movement path being in substantially the same horizontal plane wherein said first cable carrier movement path and second cable carrier movement path are substantially parallel to each other.

2. The display system of claim 1, said communication cable means being dimensioned and mounted fixed at said first end, having connections at said first end to a power and signals output source, said second end being mounted moveably and having inputs of the corresponding signals into said display device,
    said display system further comprising a suspension member,
        said suspension member being
            aligned vertically relative to the horizontal plane of said first cable carrier movement path and said second cable carrier movement path,
            secured at one end to said display device and
            having its other end mounted and positioned below said flexible cable carrier and proximate said flexible cable carrier moving end for movement along said display movement path,
    said communication cable means extending downwardly from said flexible cable carrier moving end and through said suspension member.

3. The display system of claim 1, said means for supporting said flexible cable carrier along said first cable carrier movement path and along said second cable carrier movement path comprising at least one cable carrier plate, said at least one cable carrier plate being in a gravitational supporting relationship to said flexible cable carrier, and thereby supporting said flexible cable carrier as said flexible cable carrier moving end moves back and forth with the traversal movement of said display device along said display movement path between a start movement point and an end movement point.

4. The display system of claim 1 wherein said cable first cable carrier movement path and said second cable carrier movement path have at least one substantially curved region and at least one substantially straight region in the horizontal plane of said first cable carrier movement path and said second cable carrier movement path.

5. The display system of claim 2, wherein said suspension member is rotatable around an axis substantially perpendicular to said display movement path.

6. The display system of claim 1, further comprising at least one rail along said display movement path and at least one wheel movably engaged with at least one rail, said at least one wheel being coupled to said suspension member for moving said display device along said display movement path.

7. The display system of claim 6, further comprising at least a pair of trolleys wherein each of said at least a pair of trolleys has at least one wheel, each of said at least a pair of trolleys being positioned to travel along the length of the cable carrier movement path from the starting movement point to the final movement point and wherein said at least one rail is at least a pair of rails, and wherein said at least a pair of trolleys travel on, and are supported by said at least a pair of rails.

8. The display system of claim 7, wherein said at least a pair of trolleys is four trolleys, said four trolleys being paired on two of said at least a pair of rails, a first pair of said at least a pair of rails being parallel to each other, and said four trolleys being spaced from each other by a support plate and wherein said support plate is moveable along said cable carrier movement path from a starting movement point to a final movement point.

9. The display system of claim 8 further comprising a support member, said support member being secured at one end to said display device and at its other end to said support plate for movement on said at least a pair of rails along said display movement path.

10. The display system of claim 1, further comprising said flexible cable carrier having pivoted linked mounting brackets and being pivotable about a vertical axis substantially perpendicular to the display movement path, said pivoted linked mounting brackets of said flexible cable carrier having means for retaining said cable means within said flexible cable carrier.

11. The display system of claim 1, further comprising cable carrier plate means, said cable carrier plate means being positioned for supporting said flexible cable carrier as moving end of said flexible cable carrier moves along said first cable carrier movement path and said second cable carrier movement path.

12. The display system of claim 11, said cable carrier plate means comprises a first cable carrier plate for supporting said flexible cable carrier along said first cable carrier movement path and a second cable carrier plate for supporting said cable carrier along said second cable carrier movement path.

13. A display system for moving a display along a movement path, comprising:
a display device,
a track system, said track system having;
a flexible cable carrier,
said the flexible cable carrier having a fixed end along a first cable carrier movement path,
a movable end mounted for movement along a second cable carrier movement path distinct from said first cable movement path,
said flexible cable carrier having pivoted linked mounting brackets and being pivotable about a vertical axis substantially perpendicular to the cable carrier movement path,
said pivoted linked mounting brackets of said flexible cable carrier having means for retaining said cable means within said flexible cable carrier,
a communication cable means,
said communication cable means being connected at a first end to said display device, at a second end to an output source, and
being carried within said flexible cable carrier,
means for supporting said flexible cable carrier along said first cable carrier movement path and along said second cable carrier movement path,
a suspension member, said suspension member being;
aligned vertically relative to said flexible cable carrier pivoted linked mounting brackets,
secured at one end to said display device, and
mounted at its other end for movement along said display movement path,
said other end being positioned proximate said flexible cable carrier moving end, such that said display device is suspended for movement under the cable carrier.

14. The display system of claim 13, said communication cable means being dimensioned and mounted fixed at said first end, having connections at said first end to a power and signals output source, said second end being mounted moveably and having inputs of the corresponding signals into said display device, and extending downwardly from said flexible cable carrier moving end and through said suspension member.

15. The display system of claim 13, said means for supporting said flexible cable carrier along said first cable carrier movement path and along said second cable carrier movement path comprising:
at least one cable carrier plate,
said at least one cable carrier plate being in a gravitational supporting relationship to said flexible cable carrier and supporting said flexible cable carrier as said flexible cable carrier moving end moves back and forth along said first cable carrier movement path and said second cable carrier movement path, with the traversal movement of said display device along a display movement path between a start movement point and an end movement point.

16. The display system of claim 13, wherein said first cable carrier movement path and said second cable carrier movement path have at least one substantially curved region and at least one substantially straight region,
said at least one substantially curved region, said at least one substantially straight region, said first cable carrier movement path, and said second cable carrier movement path being in the same horizontal plane.

17. The display system of claim 15, further comprising at least one rail along said first cable carrier movement path and said second cable carrier movement path, and at least one wheel movably engaged with said at least one rail, said at least one wheel being coupled to said suspension member for moving said display device along said display movement path.

18. The display system of claim 17, said cable carrier plate means comprising a first cable carrier plate for supporting said flexible cable carrier along said first cable carrier movement path and a second cable carrier plate for supporting said cable carrier along said second cable carrier movement path.

19. The display system of claim 17, further comprising at least a pair of trolleys wherein each of said at least a pair of trolleys has at least one wheel, each of said at least a pair of trolleys being positioned to travel along the length of the cable carrier movement path from the starting movement point to the final movement point and wherein said at least one rail is at least a pair of rails, and wherein said at least a pair of trolleys travel on, and are supported by said at least a pair of rails.

* * * * *